US011264141B2

(12) United States Patent
Venneri et al.

(10) Patent No.: US 11,264,141 B2
(45) Date of Patent: Mar. 1, 2022

(54) COMPOSITE MODERATOR FOR NUCLEAR REACTOR SYSTEMS

(71) Applicant: Ultra Safe Nuclear Corporation, Seattle, WA (US)

(72) Inventors: Francesco Venneri, Seattle, WA (US); Paolo Francesco Venneri, Seattle, WA (US); Lance Lewis Snead, Bellport, NY (US)

(73) Assignee: ULTRA SAFE NUCLEAR CORPORATION, Seattle, WA (US)

( * ) Notice: Subject to any disclaimer, the term of this patent is extended or adjusted under 35 U.S.C. 154(b) by 344 days.

(21) Appl. No.: 16/254,019

(22) Filed: Jan. 22, 2019

(65) Prior Publication Data

US 2020/0027587 A1   Jan. 23, 2020

Related U.S. Application Data

(60) Provisional application No. 62/619,925, filed on Jan. 22, 2018.

(51) Int. Cl.
  *G21C 5/12* (2006.01)
  *G21C 5/18* (2006.01)
  *G21C 3/60* (2006.01)
(52) U.S. Cl.
  CPC .............. *G21C 5/12* (2013.01); *G21C 5/18* (2013.01); *G21C 3/60* (2013.01)
(58) Field of Classification Search
  CPC .................................. G21C 5/12; G21C 5/18
  (Continued)

(56) References Cited

U.S. PATENT DOCUMENTS 2,816,068 A * 12/1957 Ruano ................... G21C 7/26
                                                                                            376/904
3,081,247 A *  3/1963 Balent ................... G21C 5/12
                                                                                            376/350
(Continued)

FOREIGN PATENT DOCUMENTS

CA              1336357 C  *  7/1995  ............... G21C 5/12

OTHER PUBLICATIONS

Burchell, T.D., et al., Radiation Damage in Carbon Materials, In Physical Processes of the Interaction of Fusion Plasmas with Solids, (Academic Press Inc. 1996), pp. 341-381.
(Continued)

*Primary Examiner* — Jack W Keith
*Assistant Examiner* — Daniel Wasil
(74) *Attorney, Agent, or Firm* — RatnerPrestia

(57) ABSTRACT

A composite moderator medium for nuclear reactor systems and a method of fabricating a composite moderator block formed of the composite moderator medium. The composite moderator medium includes two or more moderators, such as a low moderating material and a high moderating material. The high moderating material has a higher neutron slowing down power compared to the low moderating material. The low moderating material includes a moderating matrix of silicon carbide or magnesium oxide. The high moderating material is dispersed within the moderating matrix and includes beryllium, boron, or a compound thereof. The high moderating material is encapsulated within the low moderating material such that the high moderating material is not exposed outside of the low moderating material. The method can include selecting a sintering aid and a weight percent of the sintering aid in a composite moderator mixture based on the low moderating material and spark plasma sintering.

9 Claims, 12 Drawing Sheets

(58) Field of Classification Search
USPC .......................................... 376/350, 458, 904
See application file for complete search history.

(56) References Cited

U.S. PATENT DOCUMENTS

| | | |
|---|---|---|
| 3,278,454 A | 10/1966 | Turner et al. |
| 3,914,612 A | 10/1975 | Cason, Jr. et al. |
| 4,251,724 A | 2/1981 | Vagelatos et al. |
| 2016/0082282 A1 | 3/2016 | Kumada et al. |
| 2017/0287575 A1 | 10/2017 | Venneri |

OTHER PUBLICATIONS

Burchell, T.D., et al., Materials Properties Data for Fusion Reactor Plasma Facing Carbon-Carbon Composites. In Physical Processes of the Interaction of Fusion Plasmas with Solids, Plasma-Materials Interactions, (Academic Press, 1996), pp. 77-128.

Neely, J.J., et al., Thermal Conductivity and Heat Capacity of Beryllium Carbide., Journal of the American Ceramic Society, Dec. 1950, vol. 33, No. 12, pp. 363-364.

International Search Report and Written Opinion for International Application No. PCT/US19/14606, dated Aug. 26, 2019, 7 pages.

Contescu, C., et al., Kinetics of Chronic Oxidation of NBG-17 Nuclear Graphite by Water Vapor, Oak Ridge National Laboratory managed by UT-Battelle for the US Department of Energy, ORNL/TM-2015/142, Apr. 2015, 53 pages.

Snead L.L., et al., Handbook of SiC properties for fuel performance modeling, Journal of Nuclear Materials 371, (2007), pp. 329-377.

Walsh, K.A., et al., Beryllium Compounds, Beryllium Chemistry and Processing, edited by E.E. Vidal, ASM International, 2009, pp. 117-129.

Froment, K., et al., Neutron irradiation effects in boron carbides:Evolution of microstructure and thermal properties, Journal of Nuclear Materials 188, (1992), pp. 185-188.

Nishi, Y., et al. , Isotope Effects on Thermal Conductivity of Boron Carbide, Journal of Nuclear Science and Technology, vol. 39, No. 4, pp. 391-394 (Apr. 2002).

Dombrowski, D.E., et al. , TR-182 Thermomechanical Properties of Beryllium, vol. 5 of the Series "Atomic and Plasma-Material Interaction Data for Fusion", International Atomic Energy Agency, Vienna, Austria , (Feb. 20, 1995), 66 pages.

Extended European Search Report for European Application No. 19757094.8, dated Sep. 16, 2021, 6 pages.

\* cited by examiner

| | Slowing Down Power $\xi\Sigma_p$ | $T_{melt}$ ($T_{decomp}$) °C | Density (g/cc) | Chemical Reactivity ($O_2$, $N_2$, $H_2O$) | Crystal | Irrad. Perf. (~500 °C, >20 dpa) | Therm. Cond. (@~650 °C) W/m-K |
|---|---|---|---|---|---|---|---|
| Graphite | 0.077 | >(3000) | 1.8 | $O_2$:Rx@>800C | Hexag. | Poor | ~20 |
| SiC | 0.044 | (2860) | 3.2 | Very Low | Cubic | Excellent | ~80 |
| MgO | 0.060 | 2853 | 3.58 | Mildly Hyg. | Cubic | Excellent | ~50 |
| $Be_2B$ | 0.120 | 1504 | 1.89 | | Cubic | unknown | unknown |
| $Be_4B$ | 0.136 | 1160 | 1.94 | | Tetrag. | unknown | unknown |
| $Be_2C$ | 0.125 | (~2100) | 1.9 | N:Rx@>1100C $O_2$:Rx@>800C | Cubic | unknown | ~22 |
| $ZrBe_{13}$ | 0.129 | 1525 | 2.72 | | Cubic | unknown | ~40 |
| $TiBe_{12}$ | 0.138 | 1925 | 2.26 | | Hexag. | unknown | ~30 |
| BeO | 0.124 | 2507 | 3.015 | Very Low | Hexag. | Very Bad, anisotropic | |
| $^{11}B_4C$ | 0.087 | 2350 | 2.52 | | Rhomb. | unknown | ~12-15 |
| Be | 0.16 | 1287 | 1.85 | $O_2$:Rx@>500C | Hexag. | Bad | ~60 |

FIG. 5

COMPOSITE MODERATOR FOR NUCLEAR REACTOR SYSTEMS

CROSS-REFERENCE TO RELATED APPLICATIONS

This application claims priority to U.S. Provisional Patent Application No. 62/619,925, filed on Jan. 22, 2018, titled "Composite Moderators for Nuclear Power Systems," the entire disclosure of which is incorporated by reference herein.

TECHNICAL FIELD

The present subject matter relates to examples of nuclear systems and nuclear reactor systems, which include a composite moderator. The present subject matter also encompasses a method for fabricating the composite moderator.

BACKGROUND

Nuclear fission reactors include thermal or fast type reactors. Currently, almost all operating reactors are thermal and thus require a moderator to slow down fast neutrons so that nuclear fission can continue. Materials used for moderation need to have a very specific set of properties. First, a moderator cannot absorb neutrons itself. Conventionally, this means that the moderator should have a low neutron absorption cross-section. However, the moderator should be able to slow down neutrons to an acceptable speed. Thus, in an ideal moderator the neutron scattering cross-section is high. This neutron scattering is a measure of how likely a neutron will interact with an atom of the moderator. If the collisions between neutrons and nuclei are elastic collisions, it implies that the closer in size the nucleus of an atom is to a neutron, the more the neutron will be slowed. For this reason, lighter elements tend to be more efficient moderators.

Commonly utilized moderators, such as light water ($H_2O$), heavy water ($D_2O$), and graphite (C) have a low neutron absorption cross-section but a comparatively large neutron scattering cross-section. Neutron scattering cross-sections ($\sigma_s$) for light water, heavy water, and graphite are: 49, 10.6, and 4.7 barns, respectively. Neutron absorption cross-sections ($\sigma_s$) for light water, heavy water, and graphite are: 0.66, 0.0013, and 0.0035 barns, respectively. The moderators vary in terms of their moderating abilities, as well as in their costs.

Currently, operating thermal nuclear reactors utilize a single moderator material that is monolithic as a neutron moderator. The monolithic moderator material is typically dug out of the ground. To determine the best-suited monolithic moderator material for a nuclear reactor core, engineers analyze whether the neutron properties of the monolithic moderator material are suitable for a nuclear reactor, last for a relatively long time, and then perform an optimization. Graphite is one type of neutron moderator that is commonly utilized in nuclear reactors. Graphite is a crystalline form of the element carbon with atoms arranged in a hexagonal structure that is naturally occurring. Graphite is the most stable form of carbon under standard conditions.

However, a single monolithic moderating material has limitations, one of which is moderator lifetime that is the physical limitation of the crystals of the monolithic moderating material as the single monolithic moderating material undergoes nuclear radiation inside a nuclear reactor core. Moreover, a high moderating material, such as graphite, is unstable under nuclear radiation, which causes the high moderating material to eventually deteriorate structurally before the nuclear fuel reaches the fuel lifetime limit.

Nuclear graphite was initially developed as a moderator for the Chicago Pile nuclear reactor (i.e., the world's first nuclear reactor) and is the first and arguably most studied nuclear material. Today, a number of gas-cooled systems (e.g., prismatic or pebble-bed) and salt-cooled systems assume very large graphite nuclear reactor core loadings. While there has been continual refinement in methods to process graphite as a single moderating material, providing both higher purity and better—more isotropic forms of graphite—a hard moderator lifetime limit remains for graphite. Essentially, the physics of irradiation-induced anisotropic crystal swelling leads to gross dimensional change of the graphite moderator material, microcracking, and loss of integrity of the graphite moderator material.

Typical high-temperature gas-cooled reactors (HTGR) of approximately 200 megawatt electrical (MWe) have an associated graphite loading of approximately 600 tons. Newly anticipated salt-cooled systems will have similarly large graphite waste streams. Unfortunately, contaminated graphite poses serious waste issues for these nuclear reactor systems as evidenced by the approximately 250,000 tons of graphite waste disposed of to date. While the level of contamination is dependent on the nuclear reactor system, nuclear fuel, and nuclear fuel quality, carbon-14 ($^{14}C$) and $^3T$ contamination are unavoidable. This nuclear waste issue is compounded by the fact that the graphite moderator lifetime for high-power (high neutron influence) systems mandate in-service change-out of significant volumes of the nuclear reactor core.

SUMMARY

The various examples disclosed herein relate to composite moderator technologies for nuclear reactor systems, including nuclear reactor cores including a composite moderator and a method for fabricating the composite moderator. Several benefits are achieved with the composite moderator over individual moderator materials, such as graphite, water, and molten salt (e.g., FLiBE which combines lithium fluoride and beryllium fluoride). First, the composite moderator reduces nuclear waste compared to the individual moderator materials by serving for the fuel lifetime of the nuclear fuel without requiring change out from the nuclear reactor core. Second, the composite moderator is dimensionally irradiation stable (i.e., undergoes less structural deterioration). Third, the composite moderator improves safety characteristics by eliminating the current graphite oxidation issue.

In a first example, a nuclear reactor system includes a nuclear reactor core. The nuclear reactor core includes an array of fuel elements and a composite moderator medium formed of two or more moderators. The two or more moderators include a low moderating material and a high moderating material. The high moderating material has a higher neutron slowing down power compared to the low moderating material.

In a second example, a method includes selecting two or more moderators including a low moderating material and a high moderating material to form a composite moderator medium. The method further includes selecting a sintering aid and a weight percent (w/w %) of the sintering aid in a composite moderator mixture based on the low moderating material. The method further includes mixing the two or more moderators with the selected sintering aid at the selected weight percent (w/w %) to create the composite moderator mixture. The method further includes spark plasma sintering the composite moderator mixture to fabricate a composite moderator block formed of the composite moderator medium.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 5 is a table depicting properties, including neutron slowing down power, of a graphite moderator material compared with two types of low moderating materials of the composite moderator medium and eight types of high moderating materials of the composite moderator medium.

PARTS LISTING

100 Nuclear Reactor System
101 Nuclear Reactor Core
102A-N Fuel Elements
103 Composite Moderator Medium
104 Low Moderating Material
105 High Moderating Material
110 Containment Structure
115A-N Control Rods
120 Steam Generator
125 Steam Line
130 Steam Turbine
135 Generator
140 Electricity
145 Condenser
150 Spray
155 Water Vapor
160 Cooling Tower
200 Nuclear Fuel
201A-N Nuclear Fuel Rods
205 Fuel Compact
206A-N Fuel Particles
207 Silicon Carbide Matrix
208 Graphite Matrix
220 Composite Moderator Block
225 Fuel Composite Moderator Block
226A-N Fuel Openings
227A-B Coolant Passages
228 Coolant
230 Reflector Region
235A-N Reflector Composite Moderator Blocks
240 Inner Reflector Region
245A-N Inner Reflector Composite Moderator Blocks
250 Outer Reflector Region
255A-N Outer Reflector Composite Moderator Blocks
260 Barrel
265 Permanent Outer Reflector
270A-N Operating Control Rods
275A-N Start-Up Control Rods
280A-N Reserve Shutdown Channels

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

To deal with nuclear radiation, a composite moderator medium (e.g., solid material) is engineered that includes several moderating materials that change in a direction that collectively last a longer duration than a single moderator material. The composite moderator medium enables nuclear reactor cores to have an extended lifetime without swap out of the moderator material and to be more compact compared to graphite moderator material, for example. In addition, the composite moderator medium can be deployed in various nuclear reactor system implementations, such as a terrestrial land reactor for electricity generation or a high temperature nuclear thermal propulsion (NTP) system (e.g., compact space nuclear reactor).

Figure 1:
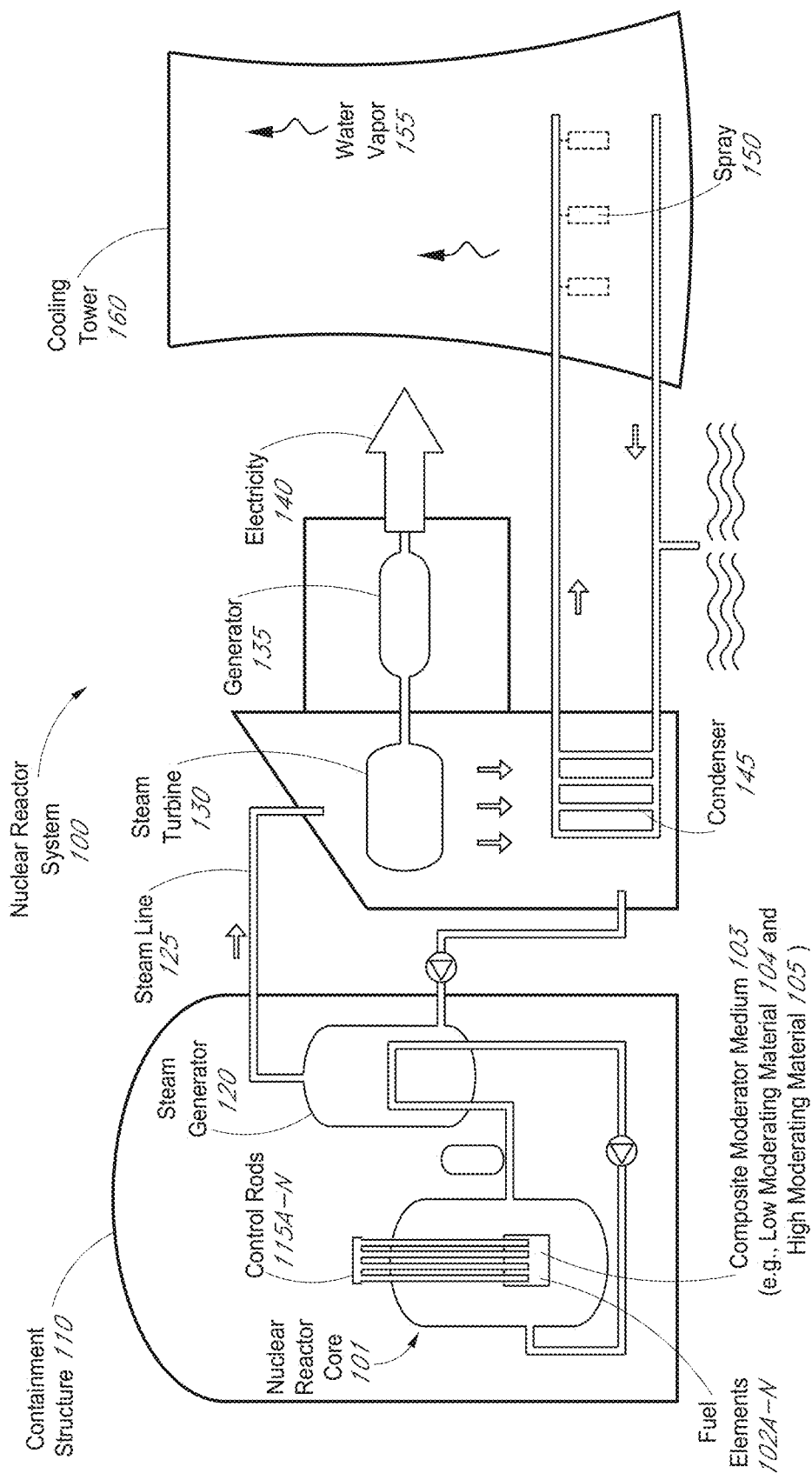
FIG. 1 is an illustration of a nuclear reactor system that depicts a nuclear reactor core, control rods, and other components of the assembly.

Reference now is made in detail to the examples illustrated in the accompanying drawings and discussed below. FIG. 1 is an illustration of a nuclear reactor system 100 that depicts a nuclear reactor core 101, control rods 115A-N, and other components of the assembly. In the example, the nuclear reactor system 100 includes a nuclear reactor 101 in which a controlled nuclear chain reactions occurs, and energy is released. In this example, the nuclear reactor system 100 is a nuclear power plant in a terrestrial land application. However, nuclear reactors and the composite moderator technologies can be utilized in a space environment, such as in a nuclear thermal propulsion (NTP) system. In such an NTP system, a generated thrust propels a vehicle that houses, is formed integrally with, connects, or attaches to the nuclear reactor core 101, such as a rocket, drone, unmanned air vehicle (UAV), aircraft, spacecraft, missile, etc. In addition, the NTP system can be used in the propulsion of submarines or ships.

Nuclear reactor core 101 includes an array of fuel elements 102A-N and a composite moderator medium 103. The nuclear reactor core 101 is a nuclear fission reactor core that includes nuclear fuel to generate megawatts or more of thermal power (MWt). A plurality of circumferential control rods 115A-N may surround the array of fuel elements 102A-N to change reactivity of the nuclear reactor core 101 by rotating the control rods 115A-N. Containment structure 110 houses the nuclear reactor core 101, control rods 115A-N, and a steam generator 120. Control rods 115A-N may be positioned in an area of the reflector regions 240, 250 (see FIG. 2C) of the nuclear reactor core 101 to regulate the neutron population and reactor power level during operation by changing reactivity of the nuclear reactor core 101.

Control rods 115A-N are composed of chemical elements such as boron, silver, indium, and cadmium that are capable of absorbing many neutrons without themselves fissioning. Nuclear reactor core 101 creates thermal energy, which is released as heat. Other components of the nuclear reactor system 100 convert the thermal energy into a useful form of energy, such as electricity 140. In the example, the nuclear reactor core 101 provides thermal energy to the steam generator 120, which extracts thermal energy into steam line 125, which turns a steam turbine 130. Steam turbine 130 drives the generator 135, which then converts the thermal energy into electricity 140. Subsequently, the thermal expansion cycle repeats.

In the example nuclear reactor system 100, a condenser 145 produces a coolant, such as a high-pressure liquid or gas, for feeding the nuclear reactor core 101 and cooling the components of the nuclear reactor system 100. For example, during the expansion cycle, the coolant stored in a cooling tower 160 can be drawn through the nuclear reactor core 101 to cool the nuclear reactor core 101. Heat from the coolant may be extracted into a cooling tower 160 as spray 150 and released as water vapor 155 from the cooling tower 160. Of note, some of the coolant may be returned, for example, bled from the nuclear reactor core 101 via a bypass to turn the steam turbine 130. In some examples, the nuclear reactor system 100 can be used in a molten salt loop application.

The neutron chain reaction in the nuclear reactor core 101 is critical—a single neutron from each fission nucleus results in fission of another nucleus—the chain reaction must be controlled. The composite moderator medium 103 is formed of two or more moderators, which effectively regulates the criticality and provides an extended moderator lifetime that can match the nuclear fuel lifetime. The two or more moderators include a low moderating material 104 and a high moderating material 105. The high moderating material 105 has a higher neutron slowing down power compared to the low moderating material 104, which can correlate to the neutron absorption cross-section and the neutron scattering cross-section. The composite moderator medium 103 in the nuclear reactor core 101 slows down the fast neutrons (produced by splitting atoms in fissile compounds like uranium-235), to make them more effective in the nuclear fission chain reaction. This slowing or moderation of the neutrons allows the neutrons to be more easily absorbed by fissile nuclei, creating more fission events. The two or more moderators can be adapted to a very specific set of properties depending on the implementation environment of the nuclear reactor core 101 (e.g., electricity generation or NTP).

Figure 6:
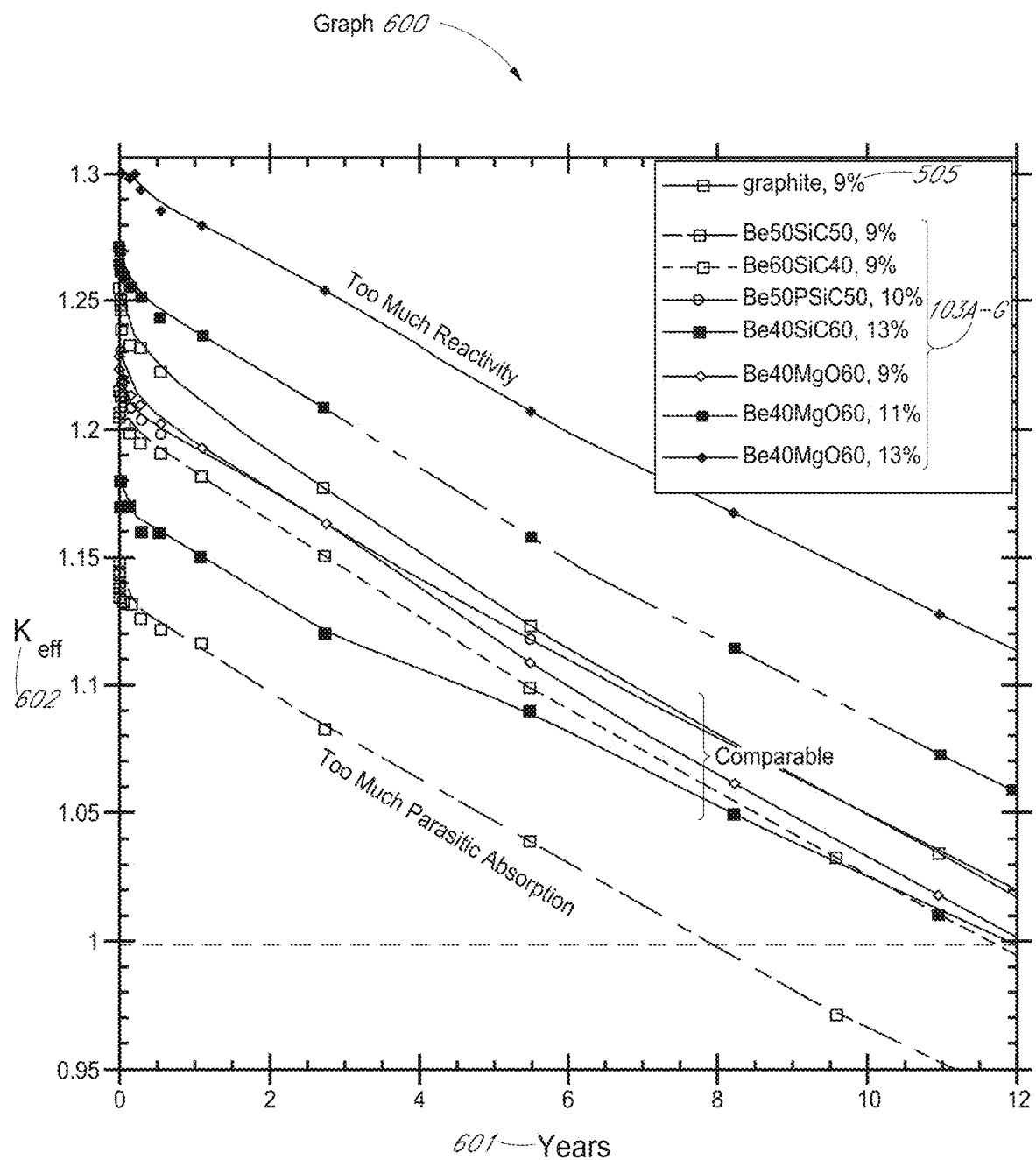
FIG. 6 is a graph illustrating reactivity over time of the nuclear reactor core that includes the graphite moderator material of FIG. 5 compared with seven different types of composite moderate media.

As will be further explained in FIGS. 5-6, the low moderating material 104 includes a moderating matrix of silicon carbide (SiC) 104A or magnesium oxide (MgO) 104B. The high moderating material 105 is dispersed within the moderating matrix and includes beryllium (Be) 105H, boron (B), or a compound thereof. More specifically, the high moderating material 105 includes at least one of beryllium boride ($Be_2B$ 105A, $Be_4B$ 105B, $BeB_2$, or $BeB_6$), beryllium carbide ($Be_2C$ 105C), zirconium beryllide ($ZrBe_{13}$ 105D), titanium beryllide ($TiBe_{12}$ 105E), beryllium oxide (BeO 105F), or boron carbide ($^{11}B_4C$ 105G). The high moderating material 105 is encapsulated within the low moderating material 104 such that the high moderating material 105 is not exposed outside of the low moderating material 104.

Figure 2A:
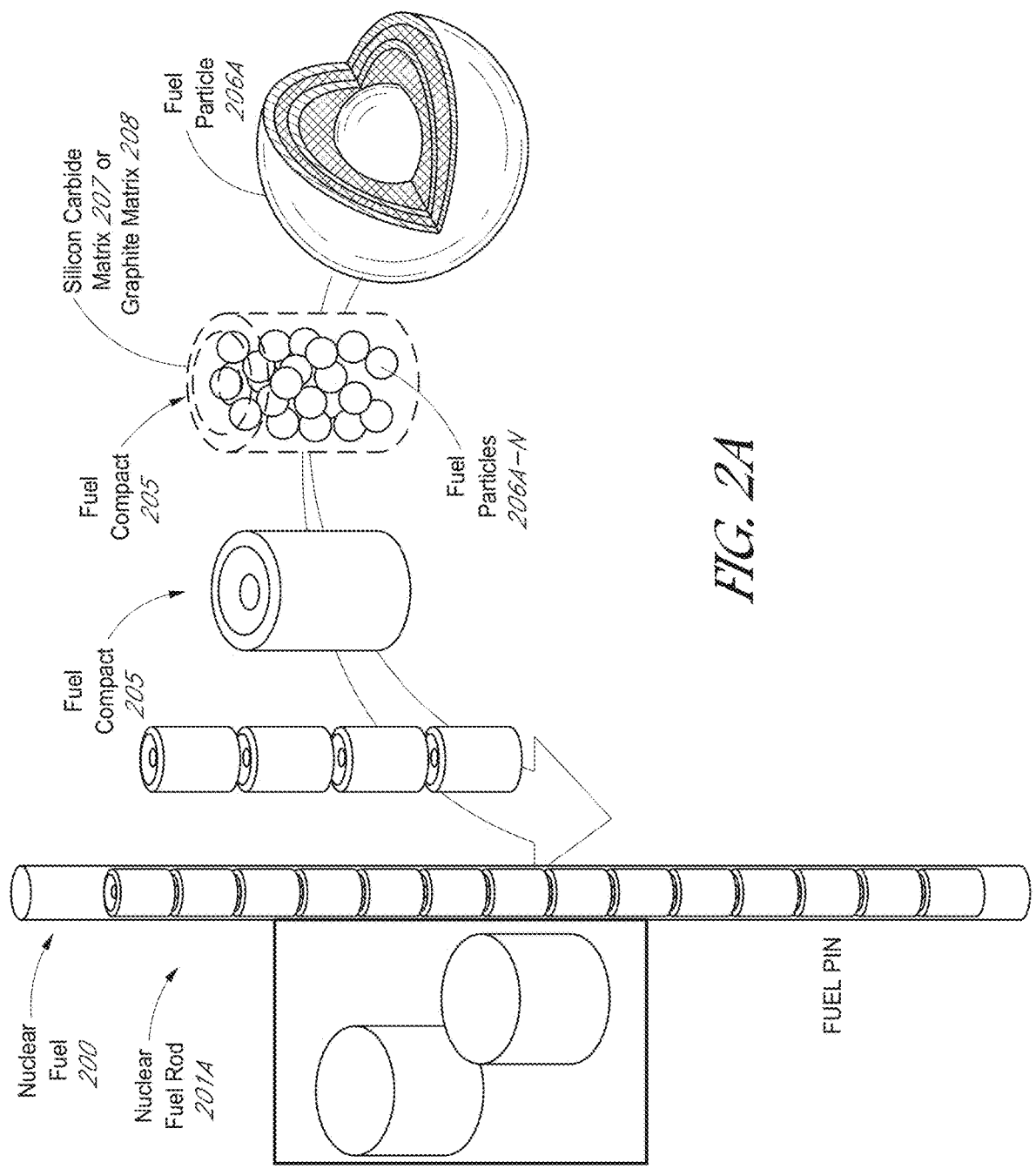
FIG. 2A is an illustration of fuel particles and a fuel compact of nuclear fuel utilized in the nuclear reactor core of FIG. 1.

FIG. 2A is an illustration of fuel particles 206A-N and a fuel compact 205 (e.g., fuel pellet) of nuclear fuel 200 utilized in the nuclear reactor core 101 of FIG. 1. In one example, the nuclear fuel 200 includes a fuel compact 205 comprised of tristructural-isotropic (TRISO) fuel particles 206A-N embedded inside a silicon carbide matrix 207. In another example, the nuclear fuel 200 includes tristructural-isotropic (TRISO) fuel particles 206A-N embedded inside a graphite matrix 208 to create fuel pellets. TRISO fuel particles 206A-N include a fuel kernel composed of UC or uranium oxycarbide (UCO) in the center, coated with one or more layers surrounding one or more isotropic materials. As shown in FIG. 2A, TRISO fuel particles 206A-N include four layers of three isotropic materials. In that example, the four layers are: (1) a porous buffer layer made of carbon, followed by (2) a dense inner layer of pyrolytic carbon (PyC), followed by (3) a ceramic layer of SiC to retain fission products at elevated temperatures and to give the TRISO fuel particle 206A a strong structural integrity, followed by (4) a dense outer layer of PyC.

TRISO fuel particles 206A-N are designed not to crack due to the stresses or fission gas pressure at temperatures beyond 1,600° C., and therefore can contain the fuel in the worst of accident scenarios. TRISO fuel particles 206A-N were designed for use in high-temperature gas-cooled reactors (HTGR) like the example cross-section of the nuclear reactor core 101 shown in FIG. 2C, to be operating at temperatures much higher than the temperatures of LWRs. The fuel compacts 205 can be loaded into fuel pins or rods, cladded, and stacked inside the numerous columns of fuel elements 102A-N. Of the possible matrix 207, 208 materials for the TRISO fuel particles 206A-N, silicon carbide (SiC) offers good irradiation behavior, and fabrication. SiC has excellent oxidation resistance due to rapid formation of a dense, adherent silicon dioxide ($SiO_2$) surface scale on exposure to air at elevated temperature, which prevents further oxidation.

The use of coated fuel particles 206A-N makes it more difficult to achieve high heavy metal density in the nuclear fuel 200, since the net heavy metal density within a fuel particle 206 falls rapidly with increasing coating thickness. This fact requires that the coating thickness to kernel diameter ratio be kept as small as possible while maintaining utility as a fission product barrier. It is, however, clear that the use of dispersion fuels in LWRs will demand higher enrichment and a lower power density. The most likely fissile particle types for composite nuclear fuels are uranium/plutonium carbides (UC or PuC) and uranium/plutonium nitrides (UN or PuN) due to the combination of high melting temperature and high actinide density. Uranium silicides could provide an even higher density of fissile uranium, but may be unstable under the expected fabrication and operation conditions. Other types of fuel particles 206A-N can be utilized including QUADRISO fuel, which includes one or more burnable neutron poisons surrounding the fuel kernel of TRISO particles, such as erbium oxide, to better manage excess reactivity, as well CerMet fuel (e.g., ceramic fuel particles 206A-N, such as uranium oxide), embedded in a metal matrix), etc.

In some examples of nuclear fuel 200, uranium dioxide ($UO_2$) powder is compacted to create a cylindrical shaped fuel compact 205 and sintered at high temperatures to produce ceramic nuclear fuel pellets with a high density and well defined physical properties and chemical composition. A grinding process is used to achieve a uniform cylindrical geometry with narrow tolerances.

Figure 2B:
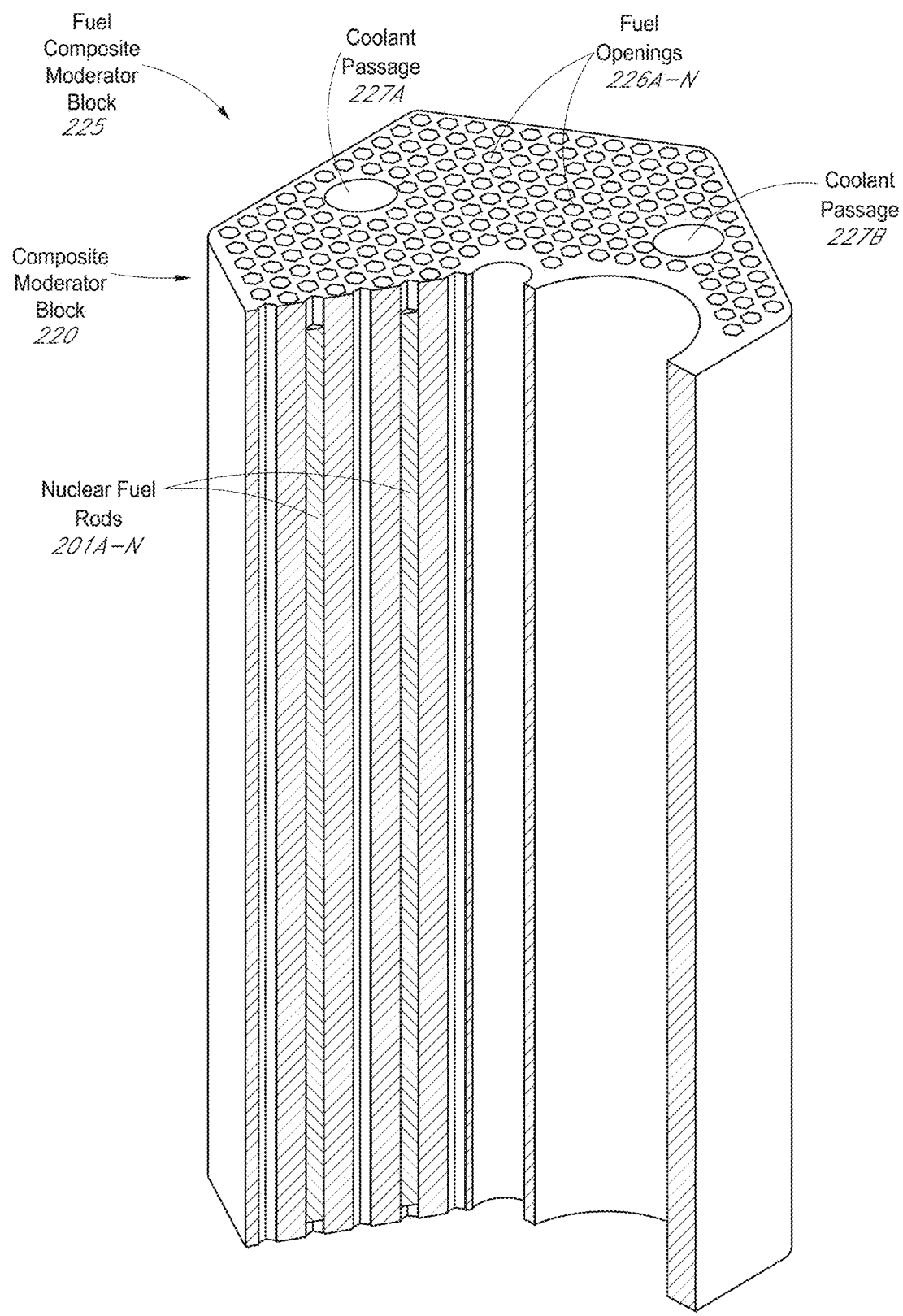
FIG. 2B is an illustration of a fuel composite moderator block of the nuclear reactor core of FIG. 1, which includes the nuclear fuel of FIG. 2A and is formed of a composite moderator medium.
Figure 2C:
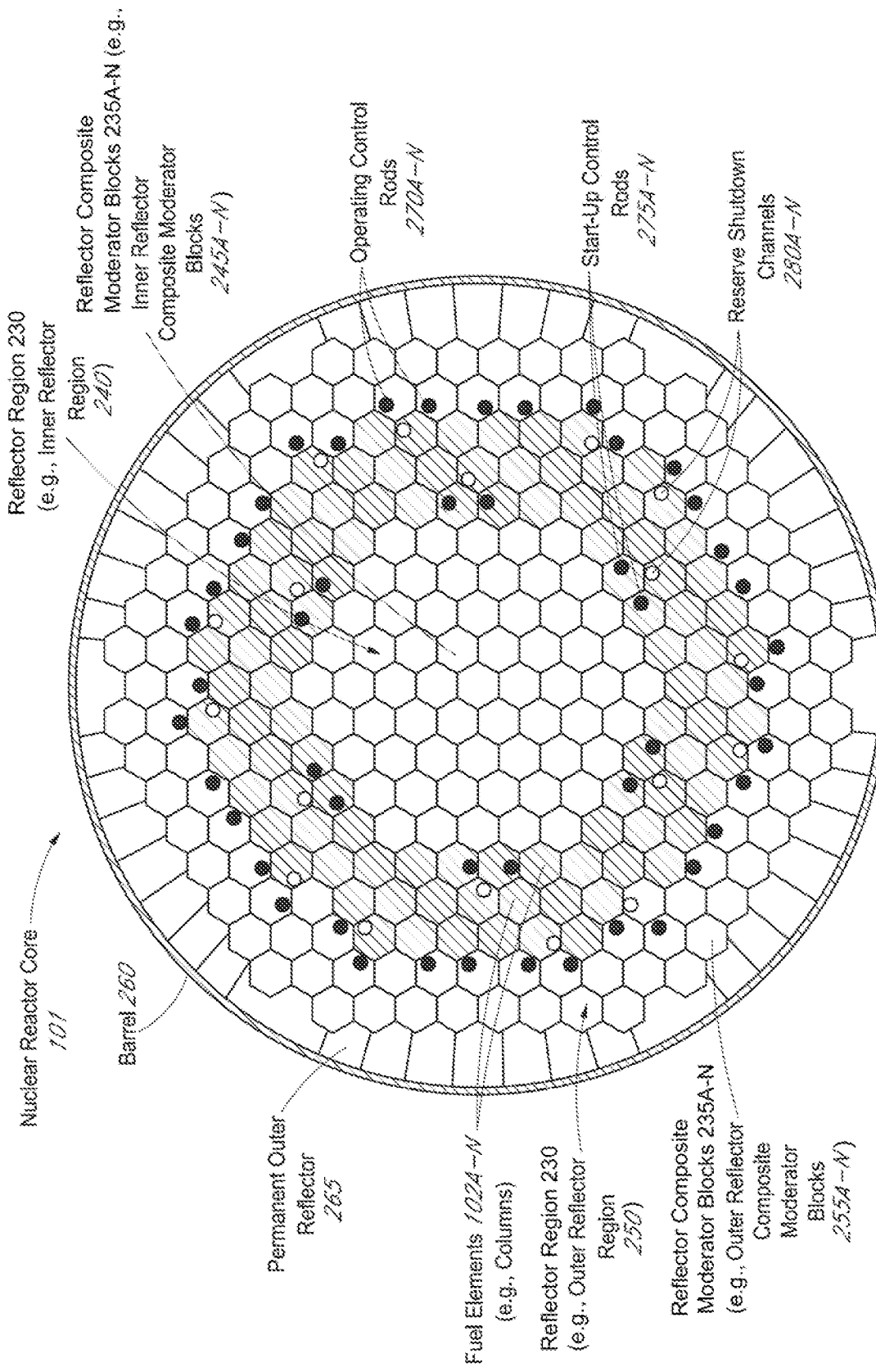
FIG. 2C is a cross-sectional view of the nuclear reactor core and components, including an array of fuel elements and reflector composite moderator blocks formed of the composite moderator medium.

FIG. 2B is an illustration of a fuel composite moderator block 225 of the nuclear reactor core 101 of FIG. 1, which includes the nuclear fuel 200 of FIG. 2A and is formed of a composite moderator medium 103. Each of the fuel elements 102A-N (as shown in FIG. 2C) includes a composite moderator block 220 formed of the composite moderator medium 103 and nuclear fuel 200. The fuel composite moderator block 225 includes fuel openings 226A-N. The nuclear fuel 200 is disposed inside the fuel openings 226A-N, such that the nuclear fuel 200 is enclosed by the composite moderator medium 103. The fuel composite moderator block 225 further includes coolant passages 227A-B to flow a coolant 228, such as a gas or liquid.

Many such fuel compacts 205 (as shown in FIG. 2A) are stacked and filled into the depicted nuclear fuel rods 201A-N (e.g., sealed tubes). Cladding is an outer layer of the nuclear fuel rods 201A-N that prevents radioactive fission fragments from escaping from the nuclear fuel 200 into the coolant 228 and contaminating the coolant 228. The metal used for the cladding of the nuclear fuel rods 201A-N depends on the design of the nuclear reactor core 101, but can include stainless steel, magnesium with aluminum, or a zirconium alloy which, in addition to being highly corrosion-resistant, has low neutron absorption. The finished nuclear fuel rods 201A-N are grouped into fuel assemblies that are used to build up the nuclear reactor core 101, as described in FIG. 2C.

FIG. 2C is a cross-sectional view of the nuclear reactor core 101 and components, including an array of fuel elements 102A-N and various reflector composite moderator blocks 245A-N, 255A-N, formed of the composite moderator medium 103. Typically, the nuclear reactor core 101 includes at least one reflector region 230 (shown as inner reflector region 240 and outer reflector region 250) that includes reflector composite moderator blocks 235A-N formed of the composite moderator medium 103. In the example arrangement of FIG. 2C, nuclear reactor core 101 includes an inner reflector region 240 and an outer reflector region 250. The inner reflector region 240 includes inner reflector composite moderator blocks 245A-N. The outer reflector region 250 includes outer reflector composite moderator blocks 255A-N. The inner reflector composite moderator blocks 245A-N and the outer reflector composite moderator blocks 255A-N are formed of the composite moderator medium 103. The array of fuel elements 102A-N, which forms a hexagonal shaped fuel block region, surrounds the inner reflector region 240. The outer reflector region 250 surrounds the array of fuel elements 102A-N. Hence, the fuel elements 102A-N are interspersed between the inner reflector region 240 and the outer reflector region 250.

In FIG. 2C, the nuclear reactor core 101 is a prismatic high-temperature gas nuclear reactor core 101. Of course, the composite moderator technologies can be utilized within any nuclear reactor core 101 that is not gas based. In the example gas nuclear reactor core 101, the composite moderator block 220 is a block of composite moderator medium 103, which is a solid material formed of both the low moderating material 104 and the high moderating material 105. Composite moderator block 220 may be prismatic shaped (e.g., hexagonally shaped) and include various openings (holes) drilled in, such as a coolant passages 227A-B to flow the coolant 228 and fuel openings 226A-N to put the nuclear fuel 200 inside. Many nuclear fuel rods 201A-N of the nuclear fuel 200 are dropped into each composite moderator block 220 to create each fuel composite moderator block 225 (e.g., a fuel bundle). The fuel composite moderator blocks 225A-N (e.g., fuel bundles) are then loaded in the nuclear reactor core 101.

Many composite moderator blocks 220 are fueled, which are shown as fuel composite moderator blocks 225A-N. The majority of the composite moderator blocks 220 are not fueled (i.e., no nuclear fuel 200 is present), and thus do not include fuel openings 226A-N. These reflector composite moderator blocks 235A-N (shown as the inner reflector composite moderator blocks 245A-N and outer reflector composite moderator blocks 255A-N) include coolant passages 227A-B to flow the coolant 228.

The array of fuel elements 102A-N includes hundreds of hexagonal shaped fuel composite moderator blocks 225A-N, of which there are 102 fuel columns in the example, where each fuel column is ten (10) fuel composite moderator blocks 225A-J high. The cross-section of the nuclear reactor core 101 is approximately six meters wide and each composite moderator block 220 is approximately 30 cm wide. In the middle of the cross-section of the nuclear reactor core 101 are the inner reflector composite moderator blocks 245A-N, which includes many columns of inner reflector composite moderator blocks 245A stacked ten per column. On the outside of the cross-section of the nuclear reactor core 101 are the outer reflector composite moderator blocks 255A-N, which includes many columns of outer reflector composite moderator blocks 255A-N stacked ten per column. Typically the control rods 115A-N, columns of fuel composite moderator blocks 225A-N, inner reflector composite moderator blocks 245A-N, and outer reflector composite moderator blocks 255A-N are the same length; however, it should be understood that the lengths can differ depending on the implementation.

Control rods 115A-N as shown in FIG. 1 include both operating control rods 270A-N and start-up control rods 275A-N, which are inserted through the top of the nuclear reactor core 101 and pass through a subset of the composite moderator blocks 220. Thirty-six (36) operating control rods 270A-N pass through a subset of the outer reflector composite moderator blocks 255A-N. Twelve (12) start-up control rods 275A-N pass through a subset of fuel composite moderator blocks 225A-N. The control rods 270A-N, 275A-N absorb neutrons. Barrel 260, such as a metal core support formed of steel, surrounds the bundled collection of array of fuel elements 102A-N, inner reflector region 240, and outer reflector region 250 of the nuclear reactor core 101 on the periphery of the nuclear reactor core 101. A permanent outer reflector 265, which can be formed of the composite moderator medium 103, is disposed between the outer reflector region 250 and the barrel 260. The permanent outer reflector 265 includes partially hexagonally shaped filler elements which surround the perimeter of the outer reflector region 250 that make up the nuclear reactor core 101. Eighteen (18) reserve shutdown channels 280A-N are positioned in area within the array of fuel elements 102A-N.

Generally, the composite moderator blocks 220A-N utilized in the fuel composite moderator blocks 225A-N, inner reflector composite moderator blocks 245A-N, and outer reflector composite moderator blocks 255A-N are all formed of the same composite moderator medium 103, have the same profile shape (e.g., helical), and have coolant passages 227A-B to flow the coolant 228. However, the composite moderator block 220 for the inner reflector composite moderator blocks 245A-N and outer reflector composite moderator blocks 255A-N does not include drilled-in fuel openings 226A-N.

Thus, from one-hundred feet away, the nuclear reactor core 101 appears to have many large hexagonal composite moderator blocks 220A-N that look nearly identical, but the fuel block region (e.g., central hexagonal shaped part of the nuclear reactor core 101) that contains the array of fuel elements 102A-N happens to include nuclear fuel 200 disposed inside the composite moderator blocks 220A-N.

Figure 3:
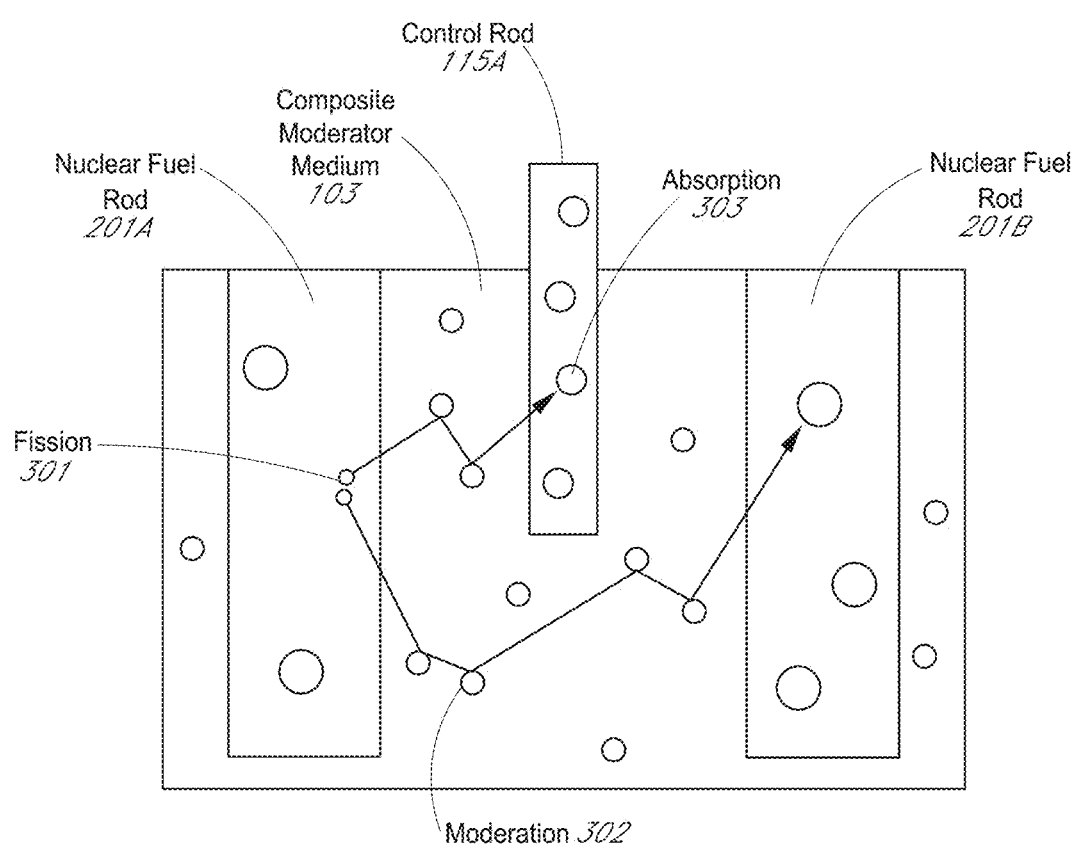
FIG. 3 is an enlarged plane view of a portion of the fuel composite moderator block of FIG. 2B depicting the nuclear fuel enclosed by the composite moderator medium.

FIG. 3 is an enlarged plane view of a portion of the fuel composite moderator block 225 of FIG. 2B depicting the nuclear fuel 200 enclosed by the composite moderator medium 103. Between blocks of fissile material of two nuclear fuel rods 201A-B, a single control rod 115A strongly absorbs 303 neutrons. The deeper the control rod 115A is inserted in between the fissile material of nuclear fuel rods 201A-B, the more difficult for the neutrons produced from fission 301 to collide, resulting in a more limited chain reaction, and a decrease in thermal energy production. As shown, composite moderator medium 103 fills the voids between fuel rods 201A-B, reducing neutron energy by slowing (moderating 302) the neutrons. Without the composite moderator medium 103, the neutrons will move too fast and thus have a very low probability of causing fission 301 of $^{235}$U and so these neutrons will pass by many, many nuclei before being absorbed and inducing fission.

Figure 4:
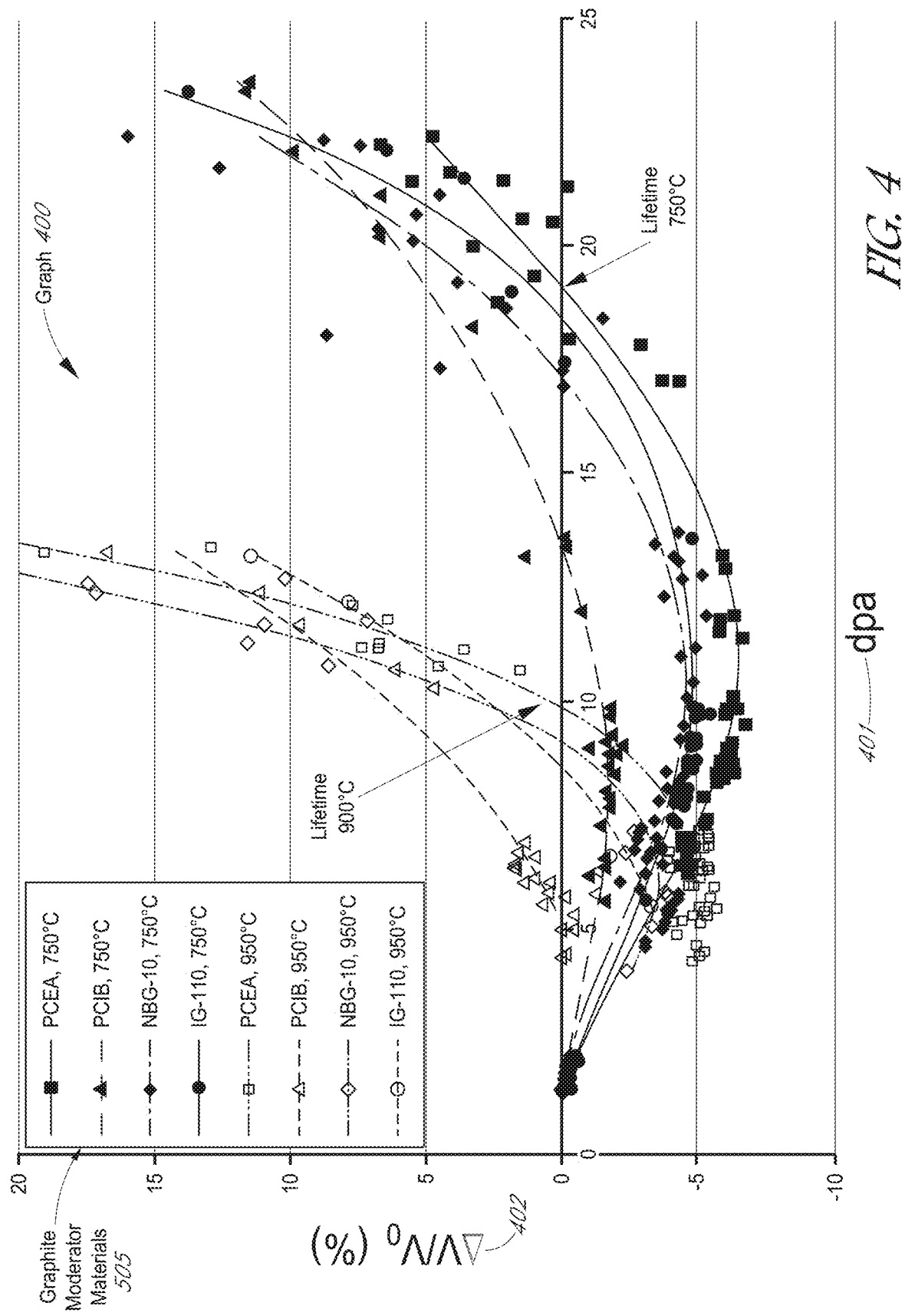
FIG. 4 is a graph illustrating dimensional change of a graphite moderator material over time while in a nuclear reactor core.

FIG. 4 is a graph 400 illustrating dimensional change of a graphite moderator material 505 over time while in a nuclear reactor core 101. In the graph 400, displacement per atom (dpa) 401 is shown on the x axis over lifetime in the nuclear reactor core and delta $\Delta V/V$ (%) 402 is dimensional change of the graphite moderator material 505. Large dimensional changes occur in nuclear graphite moderator material 505 due to neutron irradiation with implied lifetime in the 10-20 dpa (displacement per atom) range. Typically, high-power high-temperature gas-cooled reactors (HTGRs) need the nuclear reactor core graphite changed once or twice during plant lifetime.

Four different types of graphite moderator materials 505 are plotted in the graph 400, at both 750° Celsius (C.) and 900° Celsius (C.). The temperature of the graphite moderator material 505 within the nuclear reactor core is a function of position, which has great variability. The graphite moderator material 505 can be 750° Celsius (C.) at or near the bottom of the nuclear reactor core and 900° Celsius (C.) at or near the top of the nuclear reactor core. Hence, the graphite moderator material 505 has a different lifetime depending on the particular position or placement in the nuclear reactor core.

As shown in the graph 400, while in the nuclear reactor core, the graphite moderator material undergoes a big dimensional change and then falls apart and that is called "moderator lifetime." While this swelling mechanism is somewhat compensated by nuclear graphite's native porosity (essentially all nuclear graphite materials are approximately 18% porous), the moderator lifetime is associated with the point at which graphite returns to its original nil-swelling value, or the zero-point for the two traces inset into the graph of FIG. 4 for a range of the four plotted types of nuclear graphite moderator materials 505. Thus, the problem with the graphite moderator material 505 is a very limited and defined moderator lifetime from radiation damage during operating time in the nuclear reactor core.

FIG. 5 is a table 500 depicting properties, including neutron slowing down power, of a graphite moderator material 505 compared with two types of low moderating materials 104A-B of the composite moderator medium 103 and eight types of high moderating materials 105A-H of the composite moderator medium 103. As can be seen, the goal is to place (e.g., encapsulate) a high moderating material 105A-H with poor radiation performance inside a low moderating material 104A-B with good radiation performance, so the moderator lifetime of the composite moderator medium 103 is significantly extended compared to the graphite moderator material 505. As can be seen in the table 500, the slowing down power 510 of the low moderating materials 104A-B are relatively lower than the high moderating materials 105A-H. Other comparative properties included in the table 500 are melting temperature ($T_{melt}$) 515, density 520, chemical reactivity 525, crystal 530, irradiation performance 535, and thermal conductivity 540.

The composite moderator medium 103 has substantially lower dimensional change without the need for replacement. Composite moderator medium 103 is a material that can last the fuel lifetime of the nuclear reactor core 101. This is achieved by matching the neutron moderation through a two-phase structure while increasing irradiation stability through the use of a superior moderating matrix material for the low moderating material 104, such as SiC 104A or MgO 104B.

The choice of a second high moderating material 105 for an encapsulated or entrained phase in the moderating matrix phase of the low moderating material 104 is driven by the need to enhance moderation, as understood by inspection of the table 500 of FIG. 5. A simple metric of moderation is the product of average logarithmic decrement $\xi\square$ and the probability for that interaction to take place (the macroscopic cross section $\Sigma_\square$.), known as slowing down power 510. Accordingly, the composite moderator medium 103 includes the high moderating material 105A-H captured inside the low moderating material 104A-B (e.g., a moderating matrix to entrain the high moderating material 105A-H). The low moderating material 104A-B is actually relatively stable under radiation. The first example low moderating material in the table is silicon carbide (SiC) 104A, which can be chemical vapor deposition (CVD) SiC, for example.

The high moderating material 105A-H is put inside the moderating matrix of the low moderating material 104A-B. The moderator matrix of low moderating material 104A-B is weakly moderating (silicon carbide or magnesium oxide), but the high moderating material 105A-H H has large moderating capabilities. All of the high moderating materials 105A-H are better than graphite in slowing down power 510, and all of the low moderating materials 104A-B are not as good as graphite moderator material 505 in slowing down power 510. The goal is that on average the moderating ability (slowing down power 510) of the low moderating material 104A-B and the high moderating material 105A-H add together to produce a composite moderator medium 103 that is more stable under radiation and lasts longer inside the nuclear reactor core 101 than the graphite moderator material 505. In some examples of the composite moderator medium 103, the moderating matrix of low moderating material 104A-B is matched up with a high moderating material 105A-H that is a beryllium (Be) or boron (B) compound.

To successfully replace the nuclear graphite moderator material 505, the composite moderation medium 103, has a similar moderating ability and achieves a longer moderator lifetime than the nuclear graphite moderator material 505. Composite moderator medium 103 may be thought of as two-phase or more structures (e.g., components), fibrous structures, or alloys. Silicon carbide (SiC) as a low moderating material 104A has been demonstrated to survive to greater than 100 displacement per atom (dpa) with a nominal "saturated" volume change, unlike the graphite moderator material 505 as shown in FIG. 4. An example of such a structure presented here is a 45% volume fraction high moderating material 105A-H into a SiC host moderating matrix through spark plasma sintering (SPS) processing as described in FIGS. 7 and 8A-C. A second host moderating matrix is magnesium oxide (MgO), similarly processed. Manufacturing the engineered composite moderator medium 103 by this rapid, advanced manufacturing SPS technique suggests economic fabrication. Similar fabrication techniques could be hot pressing and sintering.

FIG. 6 is a graph 600 illustrating reactivity over time of the nuclear reactor core that includes the graphite moderator material 505 of FIG. 5 compared with seven different types of composite moderate media 103A-G. The graph 600 demonstrates that as a function of time—years 601 shown on the X axis—some of the composite moderator media 103A-G are better on day one and some are worse, as measured by reactivity coefficient—$K_{eff}$ 602 shown on the Y axis. Composite moderator media 103A-G can perform better or worse than graphite 505 depending on the selection of low moderating materials 104A-B and high moderating materials 105A-H. There are two versions of lifetime: (1) fuel lifetime—nuclear fuel 200 degrades and burns out and the nuclear reactor core shuts down; and (2) moderator lifetime—the moderator falls apart and a nuclear regulating authority determines the nuclear reactor is too dangerous and must be turned off.

When $K_{eff}$ 602 falls below 1, then the initial loading of nuclear fuel 200 has reached the fuel lifetime. The graph 600 does not show moderator lifetime of composite moderator media 103A-G, rather the graph 600 shows fuel lifetime and that the composite moderator media 103A-G are just as effective as the graphite moderator material 505. Graph 600 also shows that moderation can be adjusted (i.e., increased or decreased) based on the selected composite moderating media 103A-G.

Although not shown in FIG. 6, the moderator lifetime for all of the composite moderator media 103A-G is significantly extended over the graphite moderator material 505, for example, to match the fuel lifetime without replacement. The problem with the graphite moderator material 505 is the extreme expense of opening up the nuclear reactor core 101 to replace the graphite moderator material, which can be around $100 million. The composite moderator media 103A-G may be a greater upfront investment, but will save the expense needed to replace the graphite moderator material 505 in the nuclear reactor core 101 down the road. Even if more expensive on day one, the composite moderator media 103A-G will be less expensive in the future by not requiring replacement of moderator elements, which graphite moderator material 505 requires. Typically, all but the low volume permanent outer reflector 265 (see FIG. 2C) of a nuclear reactor core with a graphite moderator material 505 is replaced as the graphite moderator material 505 becomes compromised. Such change out is unavoidable unless the graphite moderator material 505 is replaced with a higher performance composite moderator medium 103.

Graph 600 presents representative calculations for a representative reactor type: a 35V % SiC Matrix Fuel (FCM®) nuclear fuel) in a small modular prismatic high-temperature gas-cooled reactor (HTGR). In the graph 600, graphite moderator material 505 is implemented in a graphite moderated nuclear reactor fueled by 9% enriched $UO_2$ TRISO FCM® nuclear fuel. As shown, due to the larger absorption of silicon carbide (SiC), some BeSiC types of composite moderator media 103A, 103D implemented in prismatic HTGR nuclear reactor cores may have an unacceptably large impact on nuclear reactor core life. Meanwhile reducing the moderating matrix fraction of SiC or increasing the porosity of the composite moderating media 103B-C, or increasing the TRISO fuel particle enrichment provides comparable lifetime to graphite moderator material 505 in the prismatic HTGR. Moreover, MgO-based composite moderator media 103E-G are seen to have very good neutronic performance.

Graph 600 presents the neutronic impact of utilizing composite moderators in a typical small modular high temperature gas-cooled reactor (HTGR). Specifically $K_{eff}$ 602 is a measure of the core reactivity, predicted as a function of years 601 and compared with the standard nuclear graphite moderator material 505. A number of cases are provided with variables of type of moderating matrix of the low moderating material 104 (100% dense SiC, 100% dense MgO and 20% porous SiC) and variable uranium enrichment of the nuclear fuel 200. In the example of FIG. 6, the nuclear fuel 200 is comprised of fuel compacts 205 of tristructural-isotropic (TRISO) fuel particles 206A-N embedded inside a silicon carbide matrix 207. Also variable is the volume fraction of the moderating matrix and beryllium phase. Shown are curves for overly parasitic moderators, solutions with too much moderation and fertile fuel (too much reactivity), and a suite of options that are comparable to nuclear graphite moderator material 505.

Figure 7:
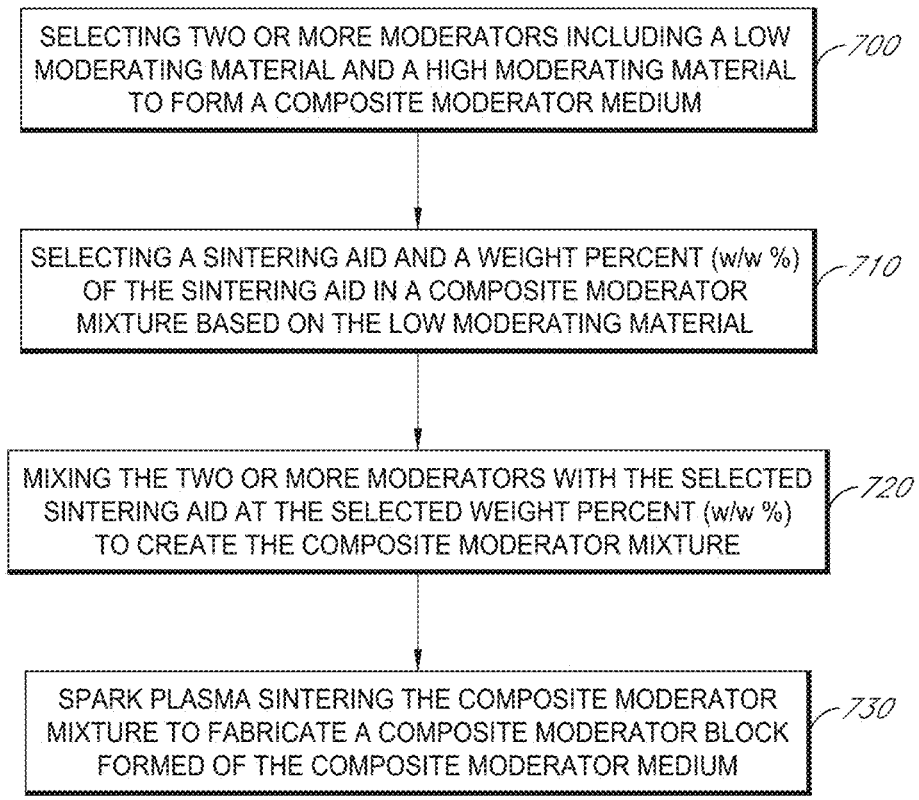
FIG. 7 is a flowchart of a method that can be implemented to fabricate a composite moderator block of the composite moderator medium.

FIG. 7 is a flowchart of a method that can be implemented to fabricate a composite moderator block 220 of the composite moderator medium 103. Beginning in step 700, the method includes selecting two or more moderators including a low moderating material 104 and a high moderating material 105 to form a composite moderator medium 103. This includes selecting powders for the low moderating material 104 and a high moderating material 105. Generally described, the low moderating material 104 includes silicon carbide (SiC) 104A or magnesium oxide (MgO) 104B. The high moderating material 105 includes beryllium (Be 105H), boron (B), or a compound thereof. More specifically, the high moderating material 105 includes at least one of beryllium boride ($Be_2B$ 105A, $Be_4B$ 105B, $BeB_2$, or $BeB_6$), beryllium carbide ($Be_2C$ 105C), zirconium beryllide ($ZrBe_{13}$ 105D), titanium beryllide ($TiBe_{12}$ 105E), beryllium oxide (BeO 105F), or boron carbide ($^{11}B_4C$ 105G).

Continuing to step 710, the method further includes selecting a sintering aid and a weight percent (w/w % or wt %) or weight fraction, of the sintering aid in a composite moderator mixture based on the low moderating material 104. This includes selecting one or more appropriate sintering aids and weight percent or fraction depending on the combination of powders for the low moderating material 104 and the high moderating material 105. Sintering aids are eutectic powers, such as oxides (e.g., yttria and alumina) for silicon carbide, and lithium for magnesium oxide. Mass percent or mass fraction can be used instead of weight percent or weight fraction to express a mixing ratio of the composite moderator mixture.

Sintering aids vary depending on, for example, the low moderating material 104. Sintering aids include various oxides, such as yttria ($Y_2O_3$) known as yttrium oxide, or alumina ($Al_2O_3$) known as aluminum oxide; and lithium. In a first example, in which the low moderating material 104 includes silicon carbide (SiC) 104A, then the sintering aid includes yttria ($Y_2O_3$) or alumina ($Al_2O_3$). In this first example, the selected weight percent (w/w %) of the sintering aid in the composite moderator mixture is 3 to 10 weight percent (w/w %), and more preferably 4 to 10 w/w %, of yttria or alumina. In a second example, in which the low moderating material 104 includes magnesium oxide (MgO) 104B, then the sintering aid includes lithium. In this second example, the selected weight percent (w/w %) of the sintering aid in the composite moderator mixture is 3 to 10 weight percent (w/w %) of lithium.

Proceeding to step 720, the method further includes mixing the two or more moderators with the selected sintering aid at the selected weight percent (w/w %) to create the composite moderator mixture. Finishing now in step 730, the method further includes spark plasma sintering (SPS) the composite moderator mixture to fabricate a composite moderator block 220 formed of the composite moderator medium 103. SPS uses additives (e.g., sintering aids) to suppress sintering temperatures, which brings down processing temperature and pressure required to carry out a process run. The sintering aids reduce temperature and time to carry out the process, which advantageously minimizes vaporization loss of the high moderating material 105 (e.g., beryllium and boron compounds) of the composite moderator medium 103.

The step of sparking plasma sintering the composite moderator mixture includes: pouring the composite moderator mixture in a mandrel; and pressing a die into the mandrel to apply a processing temperature and pressure to the composite moderator mixture to fabricate the composite moderator block 220 formed of the composite moderator medium 103. The die is like a piston that applies the processing temperature and pressure to the composite moderator mixture. Processing temperatures vary depending on, for example, the low moderating material 104.

Returning to the first example, in which the low moderating material 104 includes silicon carbide (SiC) 104A and/or the sintering aid includes yttria ($Y_2O_3$) or alumina ($Al_2O_3$), then the processing temperature is in a range between 1,400° Celsius (C.) to 1,800° Celsius (C.). At the end of the SPS processing of the silicon carbide low moderating matrix 104A, the yttria or alumina partially vaporizes. Therefore, the yttria or alumina may be partially present in the composite moderator block 220 and may be detectable in trace amounts after SPS processing in the composite moderator medium 103.

Returning to the second example, in which the low moderating material 104 includes magnesium oxide (MgO) 104B and/or the sintering aid includes lithium, then the processing temperature is in a range between 1,300° Celsius (C.) to 1,600° Celsius (C.). The lithium sintering aid completely vaporizes at the end of the SPS processing of the magnesium oxide low moderating material 104B. Therefore, the lithium is not present in the composite moderator block 220 and is not typically detectable (i.e., the lithium leaves like a fugitive additive).

Spark plasma sintering (SPS), also known as field assisted sintering technique (FAST) or pulsed electric current sintering (PECS), is a sintering technique. The main characteristic of SPS is that the pulsed or unpulsed DC or AC current directly passes through the graphite die, as well as the powder compact, in case of conductive samples. Joule heating has been found to play a dominant role in the densification of powder compacts, which results in achieving near theoretical density at lower sintering temperature compared to conventional sintering techniques. The heat generation is internal, in contrast to the conventional hot pressing, where the heat is provided by external heating elements. This facilitates a very high heating or cooling rate (up to 1,000 Kelvin per minute), hence the sintering process is very fast (within a few minutes). The general speed of the SPS process ensures it has the potential of densifying powders with nanosize or nanostructure, while avoiding coarsening which accompanies standard densification routes. SPS is a good method for preparation of ceramics based on nanoparticles with enhanced magnetic, magnetoelectric, piezoelectric, thermoelectric, optical, or biomedical properties.

Figure 8A:
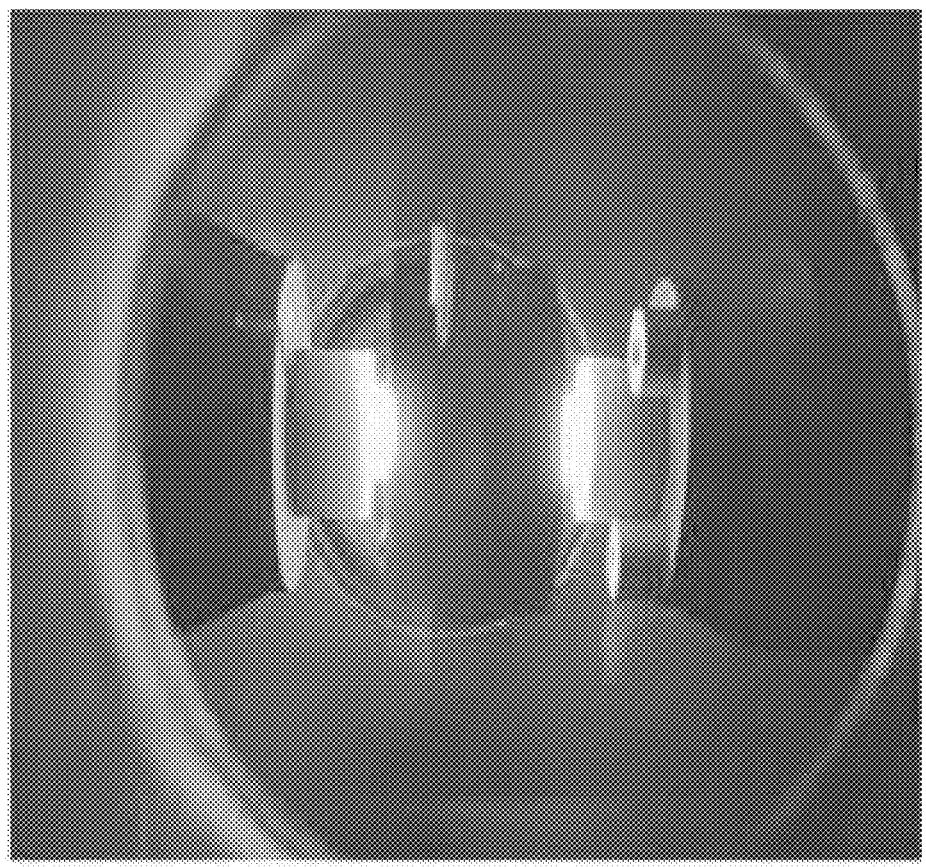
FIG. 8A is a processing photograph of the method of FIG. 7 in which spark plasma sintering (SPS) is utilized to fabricate the composite moderator block.

FIG. 8A is a processing photograph 800 of the method of FIG. 7 in which spark plasma sintering (SPS) is utilized to fabricate the composite moderator block 220. The SPS processing photograph 800 shows the SPS procedure looking through a direct current sintering (DCS) window at spark plasma sintering (SPS) materials to produce the composite moderator block 220. In this case, a graphite punch (glowing) within a graphite die containing the powders is shown through the DCS window of FIG. 8A. SPS is an advanced manufacturing technique that enables fabrication at a much lower processing temperature to rapidly produce the composite moderator block 220. The low moderating material 104 powder and high moderating material 105 powder are mixed up and sintering aids are added. SPS allows the powders to be heated up rapidly. In order to encapsulate the high moderating material 105, the low moderating material 104 is solidified before the high moderating material 105 (e.g., beryllium compounds) evaporates during SPS to form the composite moderator block 220 of the composite moderator medium 103.

Composite moderator medium 103 processing can be carried out using high-vacuum direct-current sintering (Sinterland LABOX 3010KF) of relatively pure SiC powders. Current powders being consolidated to high-density include nano-SiC powders in the 35-100 nanometer (nm) range and Acheson-derived SiC powders in the 0.2-2 micrometer (μm) range. All materials are kinetically stable, ensuring thorough, impurity free dispersion, cold pressed sintered in the spark plasma sintering apparatus.

Figure 8B:
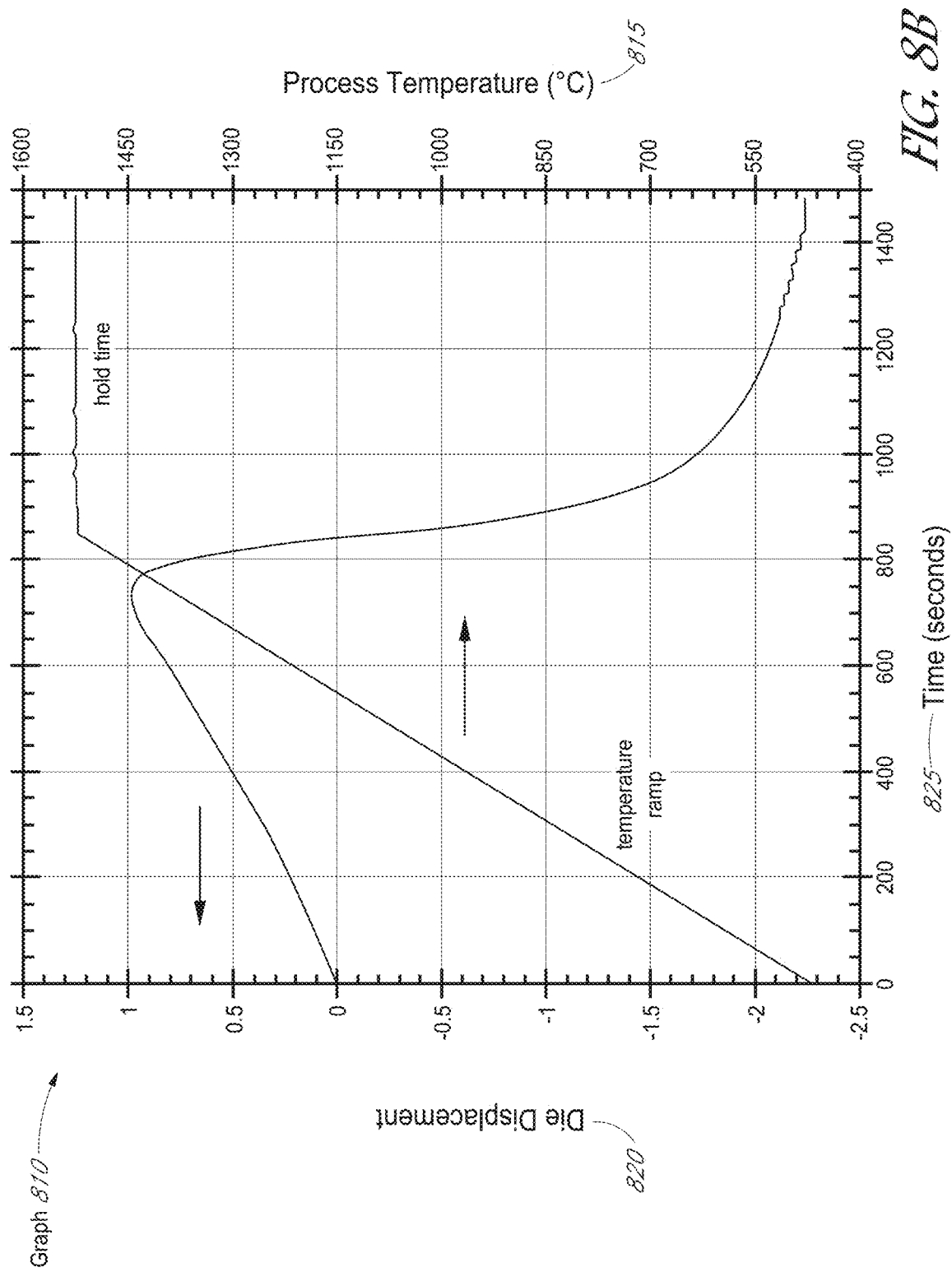
FIG. 8B is a graph illustrating a processing temperature and pressure (die displacement) over time during sparking plasma sintering of the method of FIG. 7.

FIG. 8B is a graph 810 illustrating a processing temperature 815 and pressure (die displacement) 820 over time 825 during sparking plasma sintering (SPS) of the method of FIG. 7. The graph 810 shows the temperature 815, pressure 820 (e.g., die displacement), and time 825 to do a process run with SPS to fabricate the composite moderator block 220. The graph 810 provides a relative time-temperature trace for the SPS procedure, indicating processing temperatures in the 1,500° C. range for SiC as the low moderating material 104A. Processing temperatures for the MgO as the low moderating material 104B can be in the range of 1,300-1,600° C. Run of the mill processing of a low moderating material 104, such as silicon carbide (SiC), would take several hours for a furnace to attain the needed temperature of well above 2,000° C. to fabricate the composite moderator block 220. With SPS processing, ten minutes at a processing temperature from 1,600°-1,800° C. enables fabrication of the composite moderator block 220 of the composite moderator medium 103.

In order to minimize any hygroscopic tendencies of the sintering additives, zirconium or zirconia may be added. Processing temperatures for SiC as the low moderating material 104A can be in the range of 1,400-1,800° C. with sintering additives of alumina or yttria added to enhance densification.

Figure 8C:
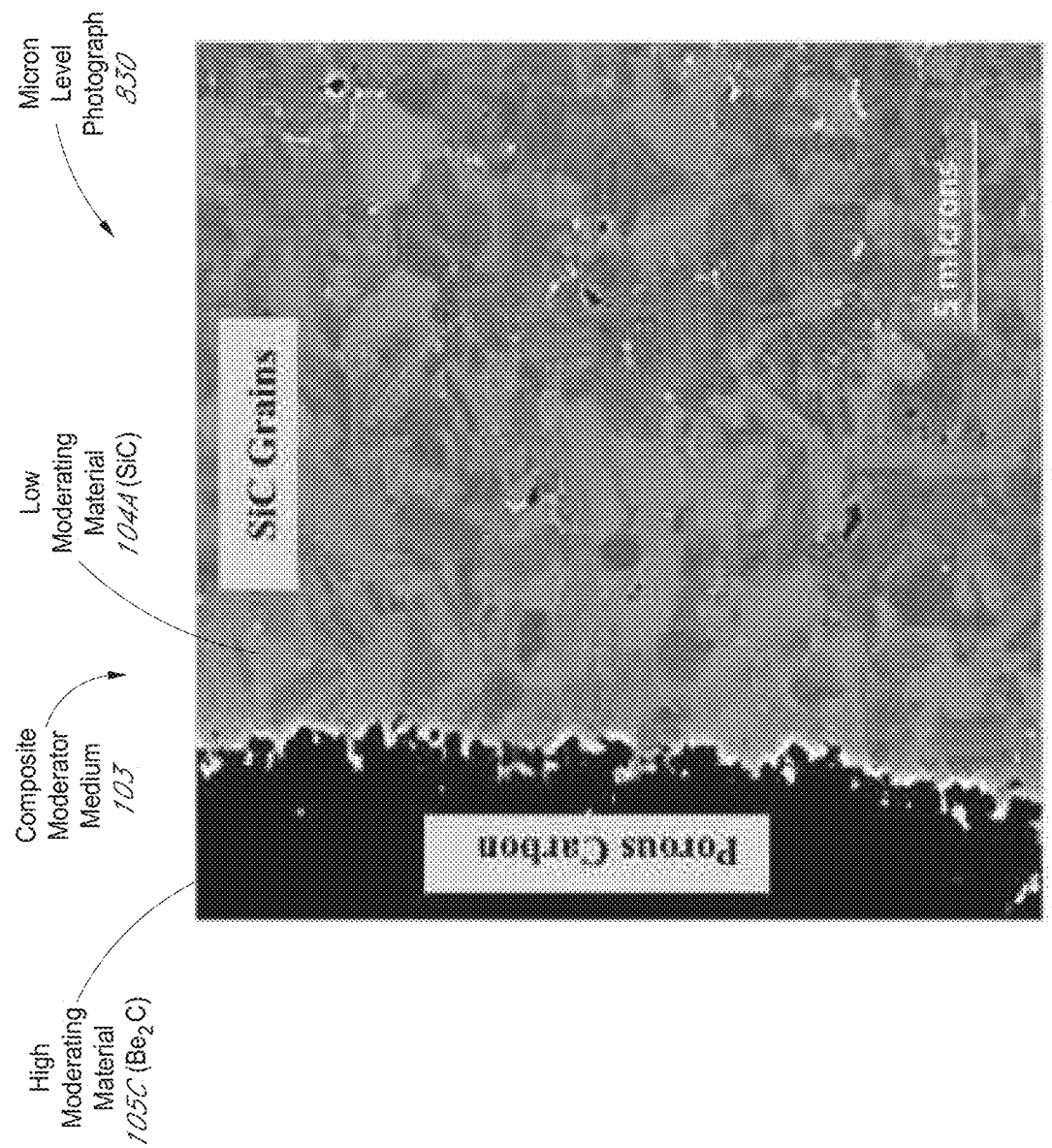
FIG. 8C is a micron level photograph of the composite moderator medium showing the low moderating material encapsulating the high moderating material.

FIG. 8C is a micron level photograph 830 of a polished cross-section of the composite moderator medium 103 showing the low moderating material 104A (SiC) encapsulating the high moderating material 105C ($Be_2C$). The micron level photograph 830 is a microscopic view of the composite moderator medium 103 of the composite moderator block 220 that is produced and shows the low moderating material 104A crystal microstructure near the interface of the high moderating material 105C. The silicon carbide moderating matrix of the low moderating material 104A completely encapsulates (covers) the porous carbon coating of the beryllium material of the high moderating material 105C ($Be_2C$). Since beryllium is toxic, encapsulation around the beryllium by the non-toxic silicon carbide low moderating material 104A is advantageous because exposure to the toxic high moderating material 105C is eliminated. The porous carbon interlayer is coated on the beryllium of the high moderating material 105C and thus is located in between silicon carbide low moderating material 104A. The silicon carbide moderating matrix (SiC) of the low moderating material 104A is completely densified around high moderating material 105C.

The micron level photograph 830 of FIG. 8C presents an image of a two-phase SiC matrix composite (moderator second phase volume fraction approximately 35%). As depicted in FIG. 8B, sintering in excess of 1500° C. was applied with a hold time of approximately 10 minutes, achieving a near full-density SiC moderating matrix density for a relatively small (8 mm diameter) part.

Various composite moderators have been disclosed for use in nuclear reactors, including advanced nuclear fission reactor applications. The composite moderator is, for example, a high moderating material 105 (e.g., beryllium containing phase) contained in a low moderating material 104 (e.g., continuum or a radiation-stable matrix phase of SiC or MgO). Similar neutronic moderation to nuclear graphite moderator material 505 can be provided through the use of the high moderating material 105, while providing a number of safety, economic, and waste reduction benefits conveyed by the use of the low moderating material 104. Thus, the composite moderators can replace nuclear graphite moderator material 505 and have superior moderator lifetime and increased safety and waste disposal attributes. Example fabrication processing includes the use of eutectic powder during spark plasma sintering (SPS) of the low moderating material 104 (e.g., radiation-stable matrices of silicon carbide and magnesium oxide) and the high moderating material 105.

As described above, a method is disclosed for fabricating a composite moderator (e.g., composite moderator block 220) formed of a composite moderator medium 103 for a nuclear reactor core 101. The method includes producing a composite moderator medium 103 (two-phase composite moderator) that includes a high moderating material 105 (e.g., second captured phase) within a continuum of a low moderating material 104 (e.g., first matrix phase). The low moderating material 104 is either SiC or MgO. The high moderating material 105 is either a beryllium containing compound, such as Be2C, BeO, or beryllium metal with a shell of Be2C or BeO. The interphase between the low moderating material 104 and the high moderating material 105 is a porous compliant structure capable of absorbing helium produced through n-alpha reactions. The composite moderator medium 103 is a lifetime component of the nuclear reactor core 101.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A nuclear reactor system comprising:
   a nuclear reactor core including:
      an array of fuel elements; and
      a composite moderator medium formed of two or more moderators;
   wherein:

the two or more moderators include a low moderating material and a high moderating material;

the high moderating material has a higher neutron slowing down power compared to the low moderating material;

the low moderating material includes a moderating matrix of silicon carbide (SiC) or magnesium oxide (MgO); and the high moderating material is dispersed within the moderating matrix and includes beryllium (Be), boron (B), or a compound thereof.

2. The nuclear reactor system of claim 1, wherein the high moderating material includes at least one of beryllium boride ($Be_2B$, $Be_4B$, $BeB_2$, or $BeB_6$), beryllium carbide ($Be_2C$), zirconium beryllide ($ZrBe_{13}$), titanium beryllide ($TiBe_{12}$), beryllium oxide (BeO), or boron carbide ($B_4C$).

3. The nuclear reactor system of claim 1, wherein the high moderating material is adjacent the low moderating material.

4. The nuclear reactor system of claim 1, wherein:
each of the fuel elements includes a fuel composite moderator block formed of the composite moderator medium and nuclear fuel;

the fuel composite moderator block includes fuel openings; and the nuclear fuel is disposed inside the fuel openings, such that the nuclear fuel is enclosed by the composite moderator medium.

5. The nuclear reactor system of claim 4, wherein:
the fuel composite moderator block further includes a coolant passage to flow a coolant gas or liquid.

6. The nuclear reactor system of claim 4, wherein:
the nuclear fuel includes a fuel compact comprised of:
tristructural-isotropic (TRISO) fuel particles embedded inside a silicon carbide matrix; or
tristructural-isotropic (TRISO) fuel particles embedded inside a graphite matrix.

7. The nuclear reactor system of claim 1, wherein the nuclear reactor core further includes at least one reflector region that includes reflector blocks formed of the composite moderator medium.

8. The nuclear reactor system of claim 4, wherein:
the nuclear reactor core includes an inner reflector region and an outer reflector region;

the inner reflector region includes inner reflector blocks;

the outer reflector region includes outer reflector blocks; and the inner reflector blocks and the outer reflector blocks are formed of the composite moderator medium.

9. The nuclear reactor system of claim 8, wherein:
the array of fuel elements surrounds the inner reflector region; and the outer reflector region surrounds the array of fuel elements.

* * * * *